US011624192B2

(12) United States Patent
Baert et al.

(10) Patent No.: US 11,624,192 B2
(45) Date of Patent: Apr. 11, 2023

(54) PANEL AND METHOD FOR PRODUCING A PANEL

(71) Applicant: Champion Link International Corporation, The Valley (AI)

(72) Inventors: Thomas Luc Martine Baert, Sint-Martens-Latem (BE); Tom Van Poyer, Jiaxing (CN); Sven Boon, Jiaxing (CN)

(73) Assignee: Champion Link International Corporation

( * ) Notice: Subject to any disclaimer, the term of this patent is extended or adjusted under 35 U.S.C. 154(b) by 0 days.

(21) Appl. No.: 16/896,343

(22) Filed: Jun. 9, 2020

(65) Prior Publication Data

US 2021/0372144 A1 Dec. 2, 2021

(30) Foreign Application Priority Data

May 26, 2020 (NL) ..................... 2025684

(51) Int. Cl.
*B32B 21/02* (2006.01)
*E04F 15/10* (2006.01)

(52) U.S. Cl.
CPC ............ *E04F 15/107* (2013.01); *B32B 21/02* (2013.01); *E04F 15/102* (2013.01); *B32B 2307/704* (2013.01); *B32B 2315/02* (2013.01); *B32B 2317/18* (2013.01); *B32B 2419/04* (2013.01); *B32B 2607/00* (2013.01)

(58) Field of Classification Search
None
See application file for complete search history.

(56) References Cited

U.S. PATENT DOCUMENTS

| | | | | |
|---|---|---|---|---|
| 1,443,097 A * | 1/1923 | Sinnett | .................... | C04B 18/28 106/687 |
| 2,332,703 A * | 10/1943 | Elmendorf | .............. | C04B 28/02 428/215 |
| 2,697,677 A * | 12/1954 | Elmendorf | .............. | C04B 18/26 106/805 |
| 2,724,655 A * | 11/1955 | Williams | ................... | C01F 5/08 106/688 |
| 2,944,291 A | 10/1957 | Prior et al. | | |
| 3,245,867 A * | 4/1966 | Clarke | .................... | C04B 28/30 428/326 |
| 3,421,597 A | 1/1969 | Blau Hans | | |
| 3,667,978 A * | 6/1972 | Vassilevsky | ............ | C04B 28/30 106/687 |
| 3,719,512 A * | 3/1973 | Danielis | .................... | C04B 9/02 106/688 |
| 3,788,870 A * | 1/1974 | Verth | ..................... | C04B 28/32 106/164.5 |
| 3,931,428 A | 1/1976 | Reick | | |
| 4,003,752 A * | 1/1977 | Isohata | .................. | E04C 2/044 106/689 |
| 4,150,185 A * | 4/1979 | Prymelski | ............... | C04B 28/32 428/326 |
| 4,242,163 A * | 12/1980 | Nakajima | ................. | E04C 2/26 106/801 |
| 4,278,728 A | 7/1981 | Honda | | |
| 4,315,967 A * | 2/1982 | Prior | ....................... | B32B 13/02 156/39 |
| 4,339,362 A * | 7/1982 | Pascau | .................... | C04B 28/32 428/319.7 |
| 4,820,345 A * | 4/1989 | Berg | ....................... | C04B 28/30 428/920 |
| 5,049,197 A * | 9/1991 | Brown | ..................... | E04F 15/12 106/688 |
| 5,336,551 A | 8/1994 | Gravier | | |
| 5,631,053 A | 5/1997 | Andersen | | |
| 5,767,178 A * | 6/1998 | Kolker | ..................... | B27N 9/00 252/607 |
| 5,776,580 A | 7/1998 | Rasmussen | | |
| 5,958,130 A * | 9/1999 | Stroeml | .................. | C04B 28/02 106/653 |
| 6,260,326 B1 * | 7/2001 | Muller-Hartburg | .... | B28B 1/008 52/762 |
| 6,319,579 B1 * | 11/2001 | Strandgaard | ............ | E04F 15/12 428/48 |
| 6,688,061 B2 | 2/2004 | Garcia | | |
| 6,761,794 B2 | 7/2004 | Mott | | |
| 6,933,043 B1 | 8/2005 | Son | | |
| 7,255,907 B2 | 8/2007 | Feigin et al. | | |

(Continued)

FOREIGN PATENT DOCUMENTS

CN 1099366 A * 3/1995
CN 1541971 A * 11/2004

(Continued)

OTHER PUBLICATIONS

Translation & Tables for RU2014307C1, Jun. 1994 (Year: 1994).*
Machine Translation of JP-08229913-A, Sep. 1996 (Year: 1996).*
Simmonds, Characterization of sawdust and shavings for pulp, Mar. 1961 (Year: 1961).*
Machine Translation of DE-2451667-A, May 1976 (Year: 1976).*
Machine Translation of SU-1143725-A, Mar. 1985 (Year: 1985).*
Machine Translation of CN-1099366-A, Mar. 1995 (Year: 1995).*
Machine Translation of CN-102225569-A, Oct. 2011 (Year: 2011).*
Wang, Value-added recycling of construction waste wood into eco-friendly cement-bonded particleboards, 2018 (Year: 2018).*
Machine Translation of WO-2020259736-A1, Dec. 2020 (Year: 2020).*
Machine Translation of CN-106082929-A, Nov. 2016 (Year: 2016).*
Machine Translation of CN-110746174-A, Feb. 2020 (Year: 2020).*
International Search Report and Written Opinion of corresponding Application No. NL 2025119 dated Jan. 14, 2021.

(Continued)

*Primary Examiner* — Jeffrey A Vonch
(74) *Attorney, Agent, or Firm* — Emerson, Thomson & Bennett, LLC; Roger D. Emerson; Peter R. Detorre

(57) ABSTRACT

The invention relates to a panel and a method for producing a panel. The panel is in particular a floor, wall or ceiling panel, and comprises at least one core layer, the core layer comprising an upper core surface and a lower core surface and at least one pair of opposite side edges; wherein the core layer comprises magnesium oxide cement and fibres dispersed in said magnesium oxide cement.

20 Claims, No Drawings

(56) References Cited

U.S. PATENT DOCUMENTS

| | | | |
|---|---|---|---|
| 7,399,510 B2 | 7/2008 | Dupouy | |
| 7,866,103 B2 | 1/2011 | Marschke | |
| 7,918,062 B2 | 4/2011 | Chen | |
| 8,287,991 B2 | 10/2012 | Donelson | |
| 8,419,877 B2 | 4/2013 | Pervan | |
| 10,167,230 B1* | 1/2019 | Wambaugh | H02S 40/32 |
| 10,328,680 B2 | 6/2019 | Pervan | |
| 10,759,697 B1* | 9/2020 | Lukkarila | C04B 18/067 |
| 10,828,881 B2 | 11/2020 | Bergelin | |
| 11,053,696 B1* | 7/2021 | Baert | E04B 1/99 |
| 2003/0233809 A1 | 12/2003 | Pervan | |
| 2004/0265555 A1* | 12/2004 | Tang | B32B 9/04 |
| | | | 428/292.1 |
| 2005/0013984 A1* | 1/2005 | Dijk | C08K 7/02 |
| | | | 428/326 |
| 2005/0193661 A1* | 9/2005 | Van Elten | E04B 2/00 |
| | | | 52/267 |
| 2005/0208258 A1 | 9/2005 | Hosokawa | |
| 2005/0286397 A1 | 12/2005 | Inagaki | |
| 2006/0115442 A1 | 6/2006 | Katz | |
| 2006/0172110 A1* | 8/2006 | Feigin | C04B 28/32 |
| | | | 428/70 |
| 2007/0033891 A1 | 2/2007 | Imbabi | |
| 2007/0246864 A1* | 10/2007 | Utagaki | C04B 28/02 |
| | | | 106/805 |
| 2008/0050556 A1* | 2/2008 | Van Elten | E04C 2/26 |
| | | | 156/39 |
| 2008/0149137 A1 | 6/2008 | Steinbrenner | |
| 2008/0314296 A1* | 12/2008 | Wisenbaker, Jr. | B28B 23/0006 |
| | | | 106/801 |
| 2008/0318004 A1 | 12/2008 | Ruhe | |
| 2009/0011279 A1 | 1/2009 | Wisenbaker, Jr. et al. | |
| 2009/0017320 A1 | 1/2009 | Donelson | |
| 2009/0155612 A1 | 6/2009 | Pervan | |
| 2009/0235607 A1 | 9/2009 | Chen | |
| 2009/0308001 A1 | 12/2009 | Wu | |
| 2010/0081008 A1* | 4/2010 | Trout | B29C 48/07 |
| | | | 106/711 |
| 2010/0115974 A1 | 5/2010 | Okaza | |
| 2011/0067336 A1 | 3/2011 | McDonald | |
| 2011/0070410 A1* | 3/2011 | Huang | B32B 5/02 |
| | | | 428/452 |
| 2011/0088597 A1* | 4/2011 | Wu | C04B 28/32 |
| | | | 106/688 |
| 2011/0244191 A1* | 10/2011 | Asakura | E04C 2/06 |
| | | | 156/62.8 |
| 2011/0290155 A1* | 12/2011 | Vlasopoulos | C04B 28/105 |
| | | | 106/801 |
| 2013/0295346 A1 | 11/2013 | Ferguson | |
| 2014/0087156 A1 | 3/2014 | Sarkis | |
| 2014/0134402 A1* | 5/2014 | Pallon | E04F 15/02038 |
| | | | 156/154 |
| 2014/0272302 A1 | 9/2014 | Ciuperca | |
| 2015/0059621 A1 | 3/2015 | Hauber | |
| 2015/0121793 A1 | 5/2015 | Segeart | |
| 2015/0314564 A1* | 11/2015 | Mancini | B32B 21/02 |
| | | | 156/60 |
| 2016/0158963 A1* | 6/2016 | Chu | E04C 2/16 |
| | | | 264/145 |
| 2016/0159032 A1* | 6/2016 | Chu | B32B 13/12 |
| | | | 156/45 |
| 2016/0214395 A1 | 7/2016 | Torfs | |
| 2016/0288447 A1 | 10/2016 | Cordeiro | |
| 2016/0369507 A1 | 12/2016 | Pervan | |
| 2016/0375674 A1* | 12/2016 | Schulte | E04F 15/02038 |
| | | | 156/220 |
| 2017/0204616 A1 | 7/2017 | Scholz | |
| 2017/0217133 A1 | 8/2017 | Jordan et al. | |
| 2018/0002932 A1* | 1/2018 | Van Giel | B32B 27/304 |
| 2018/0093448 A1* | 4/2018 | Marskell | B32B 13/02 |
| 2018/0147873 A1 | 5/2018 | De Mondt | |
| 2018/0258651 A1 | 9/2018 | Meersseman | |
| 2018/0265409 A1* | 9/2018 | Bugajski | C04B 35/6365 |
| 2018/0283014 A1 | 10/2018 | Hodgkins et al. | |
| 2019/0100651 A1* | 4/2019 | Pinelli | C08L 89/00 |
| 2019/0264449 A1* | 8/2019 | Welbourn | B32B 27/12 |
| 2019/0292793 A1 | 9/2019 | Van Vlassenrode | |
| 2019/0308914 A1* | 10/2019 | Kong | C04B 41/67 |
| 2019/0383031 A1 | 12/2019 | Baert | |
| 2020/0039190 A1 | 2/2020 | Lenaerts | |
| 2020/0047469 A1* | 2/2020 | Fang | E04F 15/107 |
| 2020/0080321 A1* | 3/2020 | Baert | E04F 15/102 |
| 2020/0123788 A1* | 4/2020 | Baert | B32B 9/045 |
| 2020/0131784 A1 | 4/2020 | Boucke | |
| 2020/0140335 A1* | 5/2020 | Brown | C04B 28/32 |
| 2020/0207118 A1 | 7/2020 | Lenaerts | |
| 2020/0207662 A1* | 7/2020 | Kipfelsberger | C04B 28/12 |
| 2020/0218415 A1 | 7/2020 | Jang | |
| 2020/0223986 A1* | 7/2020 | Van Gilst | C04B 26/02 |
| 2020/0263440 A1* | 8/2020 | Chen | B32B 7/022 |
| 2020/0284049 A1* | 9/2020 | De Rick | B32B 27/40 |
| 2020/0308846 A1* | 10/2020 | Josefsson | E04F 15/02033 |
| 2021/0214279 A1* | 7/2021 | Wambaugh | E04C 2/26 |
| 2021/0237402 A1* | 8/2021 | Baert | E04F 13/0866 |
| 2021/0355688 A1* | 11/2021 | Boo | E04F 15/02038 |
| 2021/0387436 A1* | 12/2021 | Nilsson | B32B 3/06 |
| 2021/0388623 A1* | 12/2021 | Nilsson | B32B 9/04 |
| 2022/0018140 A1* | 1/2022 | Boucké | B32B 3/06 |
| 2022/0074212 A1* | 3/2022 | Boucké | E04F 15/105 |
| 2022/0090391 A1* | 3/2022 | Nilsson | B32B 7/12 |

FOREIGN PATENT DOCUMENTS

| | | | | |
|---|---|---|---|---|
| CN | 1548396 A | * | 11/2004 | |
| CN | 1861352 A | * | 11/2006 | |
| CN | 100419019 | | 2/2007 | |
| CN | 101003990 A | * | 7/2007 | C04B 14/042 |
| CN | 100419019 | | 9/2008 | |
| CN | 101386516 | | 3/2009 | |
| CN | 102225569 A | * | 10/2011 | B28B 1/525 |
| CN | 202359769 U | * | 8/2012 | |
| CN | 202391062 U | * | 8/2012 | |
| CN | 102674791 A | * | 9/2012 | |
| CN | 102864893 A | * | 1/2013 | |
| CN | 103304258 A | * | 9/2013 | |
| CN | 203271021 U | * | 11/2013 | |
| CN | 103467059 A | * | 12/2013 | |
| CN | 103588462 A | * | 2/2014 | |
| CN | 104016655 A | * | 9/2014 | |
| CN | 104788057 A | * | 7/2015 | |
| CN | 105110743 A | * | 12/2015 | |
| CN | 105130350 A | * | 12/2015 | |
| CN | 105753428 A | * | 7/2016 | |
| CN | 106082929 A | * | 11/2016 | |
| CN | 106193507 A | * | 12/2016 | |
| CN | 106242489 A | * | 12/2016 | B32B 37/06 |
| CN | 106738201 A | * | 5/2017 | |
| CN | 106968413 A | * | 7/2017 | |
| CN | 107311602 A | * | 11/2017 | |
| CN | 108238778 A | * | 7/2018 | |
| CN | 110451919 | | 11/2019 | |
| CN | 110607893 | | 12/2019 | |
| CN | 110746174 A | * | 2/2020 | C04B 28/30 |
| CN | 110770405 | | 2/2020 | |
| CN | 111055364 | | 4/2020 | |
| DE | 2451667 A | * | 5/1976 | B27N 9/00 |
| DE | 2550857 A | * | 5/1977 | C04B 12/04 |
| DE | 3042157 A | * | 5/1982 | B01D 39/14 |
| DE | 3506555 A | * | 8/1986 | C04B 18/26 |
| DE | 3915628 A | * | 10/1990 | C04B 18/24 |
| DE | 102012000468 | | 7/2013 | |
| EP | 867573 A2 | * | 9/1998 | C04B 28/32 |
| EP | 1026341 A2 | * | 8/2000 | E04F 15/02016 |
| EP | 2025823 A1 | | 2/2009 | E04C 2/16 |
| EP | 2060389 | | 5/2009 | |
| EP | 2060389 A1 | * | 5/2009 | B32B 13/08 |
| EP | 2690142 A1 | | 1/2014 | |
| EP | 3536874 | | 9/2019 | |
| GB | 1486870 A | * | 9/1977 | B32B 13/04 |
| GB | 1527624 A | * | 10/1978 | C04B 12/04 |
| GB | 1562154 A | * | 3/1980 | C04B 14/42 |
| JP | 01096049 A | * | 4/1989 | |

(56) References Cited

FOREIGN PATENT DOCUMENTS

| | | | | |
|---|---|---|---|---|
| JP | 02175643 A | * | 7/1990 | ............ C04B 28/02 |
| JP | H0828015 | | 1/1996 | |
| JP | 08229913 A | * | 9/1996 | ........... C04B 18/167 |
| JP | 10279344 A | * | 10/1998 | ............. C04B 28/32 |
| JP | 2008279713 A | | 11/2008 | |
| JP | 2013158946 A | * | 8/2013 | |
| JP | 2013159917 A | * | 8/2013 | |
| KR | 20140066086 A | | 5/2014 | |
| RU | 1751968 A1 | * | 2/1994 | |
| RU | 2199503 C2 | * | 2/2003 | ......... C04B 18/0481 |
| SE | 19503648 | | 3/2019 | |
| SU | 1143725 A | * | 3/1985 | |
| SU | 1493633 A | * | 7/1989 | |
| WO | 2012061300 | | 5/2012 | |
| WO | WO-2012139513 A1 | * | 10/2012 | ........... B32B 13/042 |
| WO | 2014007738 | | 1/2014 | |
| WO | 2018234561 A1 | | 12/2018 | |
| WO | 2019064113 A1 | | 4/2019 | |
| WO | 2020114645 | | 6/2020 | |
| WO | WO-2020114645 A1 | * | 6/2020 | ........ E04F 15/02038 |
| WO | WO-2020161609 A1 | * | 8/2020 | ............. C04B 28/30 |
| WO | 2020197475 A1 | | 10/2020 | |
| WO | WO-2020259736 A1 | * | 12/2020 | ............. B28B 1/525 |
| WO | WO-2021123318 A1 | * | 6/2021 | ............. B32B 37/06 |
| WO | WO-2021165769 A1 | * | 8/2021 | ............. B28B 1/525 |

OTHER PUBLICATIONS

International Search Report and Written Opinion for corresponding App. No. NL 2024807 dated Sep. 18, 2020.
International Search Report and Written Opinion for corresponding App. No. NL 2024806 dated Nov. 26, 2020.
International Search Report and Written Opinion for corresponding PCT App. No. NL 2024805 dated Sep. 23, 2020.
International Search Report and Written Opinion of corresponding PCT Application No. NL2025684, dated Mar. 3, 2021.

* cited by examiner

PANEL AND METHOD FOR PRODUCING A PANEL

The invention relates to a panel, in particular a floor, wall or ceiling panel. The invention also related to a method for producing a panel, in particular a floor, wall or ceiling panel.

Magnesium oxide (MgO) based floor panels offer an alternative solution to oriented strand board or plywood-based construction materials. The panels are popular due to their high load capacity. Currently known magnesium oxide based panels, are conventionally produced by forming a mixture, typically in the form of a slurry, of a combination of substances including magnesium compounds, additives, water and other materials; pouring said mixture layer by layer in a container, typically a mould; reinforcing the moulded composition by adding reinforcing materials at least between two layers or approximate one surface; curing the mixture in a conditioned room at controlled temperature and moisture; demoulding the dried mixture from the mould once optimal curing is achieved; and cutting said mixture into the desired shape of the panel. In most cases, the mixture used in the conventional process usually contains a lot of brine thereby requiring a lot of water. This entails conditioning of the panel to about two weeks or more until optimal condition is achieved; whilst requiring a significant amount of heat to maintain optimal curing conditions. There are several problems with the current process including that it costs a lot, is overly time consuming; as well with the resulting panel, as it requires the addition of reinforcing layers that are often composed of non-natural materials such as fiberglass or plastics, and is easily degraded under conditions of high temperature and/or high moisture.

It is an object of the invention to provide a panel, in particular a decorative building panel, such as a wall, flooring or ceiling panel and/or a method of producing such panel, which at least partially overcomes the above-mentioned disadvantages of the prior art.

The invention provides thereto: a panel, in particular a floor, wall or ceiling panel, comprising:
- at least one core layer, the core layer comprising an upper core surface and a lower core surface and at least one pair of opposite side edges;
- wherein the core layer comprises magnesium oxide cement and at least 20 wt % of natural fibres dispersed in said magnesium oxide cement, wherein the magnesium oxide cement comprises at least 30 wt % magnesium oxide; and
wherein the core layer has a density in the range of 1350 kg/m3 to 1550 kg/m3.

The panel according to the present invention benefits of a density which is significantly higher than conventional magnesium oxide based panels and also than natural fibres based HDF panels. Due the combination of magnesium oxide cement comprising at least 30 wt % magnesium oxide and at least 20 wt % natural fibres and the core layer having a density in the range of 1350 kg/m3 to 1550 kg/m3 a panel, in particular core layer of a panel, is obtained having a relatively good flexural and structural strength. This enables that the use an reinforcing layer in the core layer can be completely omitted. Magnesium oxide cement based panels according to the prior art often apply a fiberglass reinforcing layer in order to obtain a panel which is sufficiently strong. However, the use of fiberglass is undesired for various reasons. The fiberglass may eventually erode thereby posing a risk for the panel to weaken. Further, since fiberglass is not used, the core layer according to the present invention is found to be easier to mill and process, for example in order to provide complementary coupling means. Hence, the adaptability of the panel is increased, resulting in larger degree of freedom for the design and/or production. The use of complementary coupling means is in practice challenging for a magnesium oxide cement based panel due to the brittleness of the material. Despite that several publication claim that interconnecting coupling means, in interconnecting coupling means particular being configured for both horizontal and vertical locking, can be applied, this is in practice not feasible. Even the application of a simple tongue and groove combination is a severe challenge for conventional magnesium oxide cement based panels as the panels tend to break, crack and/or rupture. Since the panel according to the present invention has an improved flexural and structural strength when compared to conventional magnesium oxide cement based panels, this sensitivity for damage, in particular due to brittleness and lack of flexibility, is overcome. This does not only enable the optional use of complementary coupling means, but also enables a larger freedom in practical application of the panel as such. Prior art panels are often limited for use as wall and/or ceiling panels, where the use as floor panel cannot be guaranteed due to its fragility. Conventional magnesium oxide cement panels are typically not sufficiently resistant for forces applied during (intensive) use and/or peak loads, which limitation is overcome by the present invention. The panel according to the present invention can be both configured for and suitable for use as floor panel. The use of natural fibres is also beneficial from economical point of view, as natural fibres are typically cheaper than fiberglass, or any other conventional reinforcing material.

In the prior art it is known to produce magnesium oxide cement based panels via an extensive and time consuming process of drying of a magnesium oxide cement slurry, wherein the slurry contains at least 50 wt % of water, and often even over 60 wt % water. This production process allows a wet slurry to set in moulds, creating a sediment at its bottom moulded surface that has a higher density compared to the core and upper surface of the slurry, which contains bubbles created during the chemical reactions in the curing process, and lower density components such as wood fibres that float upward in the slurry before full curing is achieved. It is clear that the relatively low density and fragility of the material throughout most of the volume of the panel produced according to the prior art pose limitations for use as a decorative building panel. Further, it is typically attempted to achieve a density as low as possible for magnesium oxide cement based panels due to relatively light panels being more easy to handle for building purposes. Magnesium oxide cement based panels according to the prior art, and in particular the core layer of such panel, typically have a density between 600 and 1000 kg/m3. For specific embodiments of prior art magnesium oxide cement panels, densities of 1000 to 1200 kg/m3 have been observed, which is still considerably lower than the density of the core layer of the panel according to the present invention. Surprisingly it was found that a magnesium oxide cement based core layer having a density of 1350 to 1550 kg/m3, densities practically impossible to reach when produced according to the prior art, has very usable characteristics for use in floor-, wall- and/or ceiling coverings. As indicated, the panel according to the present invention benefits of a good flexural and structural strength. In addition that this contributes to the usability of the panel, the good flexural and structural strength further lowers the risk of damaging of the panel. Damaging can for example occur in the form of cracking and/or splitting of the panel during use and/or handling.

When compared to convention MgO-based panels and/or HDF panels, the panel according to the present invention benefits of an enhanced modulus of rupture (MOR) and modulus of elasticity (MOE). This benefit can at least partially be explained by the relatively high density of the panel.

The combination of materials used in the core layers enables that the core layer has relatively good stability under high temperatures and/or high humidity. In fact, especially when compared to HDF panels and conventional MgO panels, the panel according to the present invention exhibits relatively high waterproof and heat resistant properties, meaning that the panel is more stable when in water thereby exhibiting less swelling and is also more tolerant to heated thereby exhibiting less shrinking. This effect makes the panels in particular suitable for use as a building material, such as for flooring, wall and/or ceiling panels. A further benefit of the use of natural fibres in the magnesium oxide cement is that this reduces the overall weight of the panel whilst and may also have a sound dampening effect.

The panel according to the present invention in particular benefits of the high density due to its clever production method which allows for good encapsulating of the natural fibres within the magnesium oxide cement. Hence, the natural fibres in fact form a reinforcing network within the core layer. This can be at least partially explained by the panel, and in particular the core layer, being subjected to a relatively high pressure force of more than 7 Mpa during production. Also the efficient use of process water during production is found to contribute to the beneficial material properties of the final product.

The panel according to the present invention is preferably free of phenolic and/or thermoplastic resins. There is no need to use any resins, in particular phenolic and/or thermoplastic resins, as the panel according to the present invention already benefits of sufficient waterproofness. This is beneficial as in particular phenolic resins can be highly toxic, causing risks during the production process, but even after installation of the panels it is found that phenol can be emitted to the atmosphere for example due to moisture degradation of the panel.

Within the scope of the present invention, when it is referred to magnesium oxide cement it can also be referred to magnesia cement. The indication wt % indicates the percentage by weight. Where it is referred to natural fibres, also the term natural particles, fibrous chips and/or natural chips can be used within the scope of the present invention.

In a preferred embodiment of the panel according to the present invention, the average length of at least part of the natural fibres is at least 2 mm. It is beneficial to apply natural fibres having an average length of at least 2 mm as natural fibres having said length can positively contribute to the internal structure of the core layer. At least part of the natural fibres are typically encapsulated by the magnesium oxide cement, thereby forming a network of fibres dissipated over the entire core layer. Hence, the natural fibres in fact form a reinforcing network within the core layer. An average fibre length of at least 2 mm allows for good encapsulating of the fibres and for the provision of an effective reinforcing network.

Natural fibres having an average length below 2 mm cannot sufficiently contribute to improving the flexural and/or structural strength of the panel for specific purposed. The use of smaller fibres, such as dust and/or powder, will result in a relatively brittle panel which is prone to breaking. Further, this will also not allow application of interlocking coupling means for the panels. Hence, in order to be able to obtain the desired material properties for the magnesium oxide cement for the core layer, the at least 10 wt % of natural fibres having an average length of at least 2 mm is recommended. An average fibre length is mentioned, as natural fibres typically vary in their sizes, such as shape, length and/or diameter. It is conceivable that a, relatively small, fraction of natural fibres having a length below 2 mm present. It is also conceivable that the average length of at least part of the natural fibres is between 2 and 5 mm. In another preferred embodiment, the average length of at least part of the natural fibres is between 2 an 10 mm, in particular between 2.5 and 8 mm, more in particular between 3 and 5 mm. It is also conceivable that at least 50 wt % of the natural fibres dispersed in the magnesium oxide cement has an average length of at least 2 mm.

The natural fibres can for example be plant fibres, mycelium fibres and/or animal fibres. In a preferred embodiment, the natural fibres comprise lignocellulosic fibres. Hence, at least a fraction of the natural fibres may comprise lignocellulosic fibres. It is also conceivable that the natural fibres are formed by lignocellulosic fibres. Lignocellulosic fibres are typically microstructurally seen nonuniform along any three-dimensional orientation. This is a notable difference to synthetic fibres, like carbon and/or glass fibre. However, despite this nonuniformity of the natural fibres, they surprisingly found to be able to form an effective reinforcing network within the core layer comprising magnesium oxide cement. Lignocellulosic fibres further benefit of being relatively cheap, in particular when compared to fiberglass.

The natural fibres may possibly comprise wood fibres. It is conceivable that the wood fibres are hardwood fibres or softwood fibres. However, it is also conceivable that a combination of hardwood fibres and softwood fibres is applied. The wood fibres may for example be pine, oak and/or poplar fibres. It is also conceivable that the natural fibres comprise bamboo fibres.

In a further preferred embodiment, the core layer comprises at least 30 wt % natural fibres. It is conceivable that the core layer comprises up to 60 wt % of natural fibres, preferably up to 50 wt %. Non-limitative examples are the core layer comprising between 25 and 45 wt % of natural fibres or between 30 and 40 wt % of natural fibres. Yet another non-limitative example is the core layer comprising between 15 and 25 wt % natural fibres, and preferably between 17 and 20 wt %. In a preferred embodiment, the spatial variation of density of the core layer is below 10%, preferably below 8%, even more preferably below 6%, over the (entire) volume of the core layer. It is also conceivable that the spatial variation of density of the core layer is below 4%, preferably below 2%, even more preferably below 1%, over the (entire) volume of the core layer. Typically, the spatial variation of the density of the core layer of a panel according to the present invention is minimal. Possibly, the density of the core layer is substantially constant over the (entire) volume of the core layer. Hence, the core layer is substantially homogeneous over the entire volume of the core layer. The core layer is in particular free of any regions and/or zones having an increased density. Regions having an increased density are generally observed for conventional magnesium oxide cement based panels. The increased density regions observed in the prior art panels are typically obtained by applying a conventional production process using excessive water and/or by the use of integrated reinforcing layers.

The magnesium oxide cement comprises preferably at least 35 wt % magnesium oxide, and more preferably at least 40 wt %, and even more preferably at least 45 wt %. It is for example imaginable that the magnesium oxide cement comprises between 35 and 55 wt % magnesium oxide, preferably between 40 and 50 wt %. In a possible embodiment, the magnesium oxide cement comprises magnesium hydroxide. It is conceivable that at least part of the magnesium oxide is converted into magnesium hydroxide during the production process of the magnesium oxide cement. In yet further possible embodiment, the magnesium oxide cement may comprise magnesium chloride (MgCl2) and/or magnesium sulphate (MgSO4). It is for example possible that the magnesium oxide cement comprises up to 30 wt % of magnesium chloride, and preferably up to 25 wt %, and/or up to 30 wt % of magnesium sulphate, and preferably up to 25 wt %. It is also conceivable that the magnesium oxide cement comprises both magnesium chloride and magnesium sulphate, preferably up to 30 wt %, and preferably up to 25 wt %.

It is also imaginable that at least one core layer at least partially comprises a magnesium crystal structure. The formation and microstructure of a magnesium oxide cement can be described in "crystal" or "hydration" phases and expressed in terms of a ternary system consisting of the ratio of magnesia, a magnesium salt such as magnesium sulphate or magnesium chloride, and water. Crystalline phases are formed upon curing into a ceramic compound and can be expressed in an abbreviated version referring to the molar ratio of each in the crystal formed. Magnesium oxysulphate cement, which uses the salt magnesium sulphate as a key binding material, can form two stable crystalline phases under ambient conditions; one of which is composed of the compounds magnesium oxide, magnesium sulphate and water, generally referred to as the 5-phase (also known as 5-1-3 phase, standing for 5Mg(OH)2.MgSO4.3H2O), and 3-phase (also known as 3-1-8 phase, standing for 3Mg(OH)2.MgSO4.8H2O). Magnesium oxychloride similarly can form two stable crystalline phases, generally referred to as the 3-phase (also known as 3-1-8 phase, standing for 3Mg(OH)2.MgCl2.8H2O), and 5-phase (also known as 5-1-8 phase, standing for 5Mg(OH)2.MgCl2.8H2O). Other phases can form under extreme pressures and temperatures but are not stable under livable temperatures.

It is also conceivable that the core layer and/or the magnesium oxide cement comprises at least one filler, such as but not limited to talc, calcium carbonate (CaCO3), perlite, polymer foam beads and/or a combination thereof. The core layer may for example comprise up to 15 wt % and preferably up to 10 wt % of fillers. The core layer and/or the magnesium oxide cement may also comprise at least one additive. At least one additive can for example be chosen from the group consisting of: a pigment, a colorant, an impact modifier, a lubricant, a stabilizer, a wax, an antihalogen agent and/or an aid processing agent. The core layer may for example comprise up to 5 wt % of additive(s), preferably up to 2 wt %. A non-limiting example is the core layer comprising up to 1 wt %, preferably up to 0.5 wt % and more preferably up to 0.25 wt % ferric oxide (FeO3).

Typically, the core layer has a thickness between 3 and 30 mm. It is for example conceivable that the core layer as a thickness between 3 and 15 mm, in particular between 5 and 10 mm. Due to the outstanding material properties of the core layer, the panel can be relatively thin compared to conventional panel configured for the same purpose. In a further preferred embodiment, the core layer has a density in the range of 1375 to 1550 kg/m3, preferably in the range of 1400 to 1500 kg/m3. It is for example possible that the density of the core layer substantially equals 1400 kg/m3. Said density ranges are still found to provide good flexural and structural strength.

The core layer according to the present invention is found to be sufficiently strong for the provision of coupling parts. Hence, preferably, at least one pair of opposite side edges of the panel, and in particular of the core layer, is provided with complementary coupling parts. For example, the core layer comprises at least one pair of complementary coupling parts on at least two of its opposite side edges. Said coupling parts may for example be interlocking coupling parts configured for mutual coupling of adjacent panels on multiple directions. Preferably, said interlocking coupling parts provide locking in both horizontal and vertical directions. Any suitable interlocking coupling parts as known in the art could be applied. For example, said interlocking coupling parts may be in the form of complementary tongue and groove, male and female receiving parts, a projecting strip and a recess configured to receive said strip or any other suitable form. It is conceivable the mutually coupling parts require a downward scissoring motion when engaging, or are locked together by means of a horizontal movement. The complementary coupling means may even, according to the present invention, allow elastic deformation in order to be engaged and/or disengaged. In a preferred embodiment, at least one pair of complementary coupling parts is configured such that in a coupled state a pretension is existing. This pretension means that the complementary coupling parts exert forces onto each other in coupled state such that the complementary coupling parts, and thus the adjacent panels are forced towards another. The complementary coupling parts thereby co-act in a substantially clamping manner, resulting in a more reliable coupling of the adjacent panels. The pretension may also positively contribute to the stability of the adjacent panels in a coupled state. It is for example conceivable that the complementary coupling parts have at least partially overlapping contours.

In a preferred embodiment, the panel comprises at least one decorative top layer attached to the upper core surface of the core layer. The decorative top layer may for example be attached to the upper core surface of the core layer by means of an adhesive layer. The decorative top layer can for example comprise at least one décor layer and at least one base coating layer. The décor layer may be formed by a decorative print which is printed directly on the upper core surface of the core layer. That the core layer is relatively stable under several ambient conditions, and not sensitive to swelling allows that a relatively large number of different top layers can be applied. Further non-limiting examples of possible decorative top layers which can be used are a PVC decorative film, a PP decorative film, and/or PET decorative film. The decorative top layer may also comprises a wear layer, preferably a transparent and/or thermoplastic wear layer. It is also conceivable that the decorative top layer comprises a stone or a wood veneer. In case a stone veneer is applied, the stone veneer preferably comprises a material selected from the group: natural stone, marble, granite, slate, glass and/or ceramic. The decorative top layer may for example comprise a ceramic tile. Due to the core layer according to the present invention having a good flexural and structural strength, the core layer is strong enough to be used in combination with a ceramic tile. This also applies to other relatively heavy top layers, wherein the core layer according to the present invention can provide sufficient support. In case a decorative top layer comprising ceramic is applied, the ceramic may be of a type selected from the group: monocuttura ceramic, monoporosa ceramic and/or porcelain ceramic. The ceramic may also be a multi-cased ceramic. It is also conceived that the decorative top layer comprises a high-pressure laminate (HPL), a plurality of impregnated layers, a decorative plastic or vinyl, linoleum, and/or decorative thermoplastic film. The panel according to the present invention could optionally comprise at least one backing layer. Such backing layer, if applied, is preferably attached to the lower core surface of the core layer. It is also conceivable that the panel comprises (at its bottom surface) at least one balancing layer, generally composed of at least one layer comprising lignocellulose and a cured resin. The panel may also comprise at least one acoustic layer, usually composed of a low density foamed layer of ethylene-vinyl acetate (EVA), irradiation-crosslinked polyethylene (IXPE), expanded polypropylene (XPP) and/or expanded polystyrene (XPS). It is also conceivable that such acoustic layer comprises nonwoven fibres, wherein possibly the acoustic layer can be made from natural fibres like hemp or cork. However, the acoustic layer may also comprise a recycled and/or recyclable material, such as PET and/or rubber. The density of this acoustic layer, if applied, preferably has a density between 65 kg/m3 and 300 kg/m3, most preferably between 80 kg/m3 and 150 kgm3. At least one backing layer may also be an adhesive layer in particular configured to attached the panel onto a surface. It is also imaginable that multiple backing layers are applied or that the backing layer is a combination of any of the said layers.

The invention also relates to a floor-, wall- and/or ceiling covering comprises a plurality of panels according to the present invention. The invention also relates to a panel, in particular a floor, wall or ceiling panel, comprising at least one core layer, the core layer comprising an upper core surface and a lower core surface and at least one pair of opposite side edges; wherein the core layer comprises magnesium oxide cement and at least 10 wt % of natural fibres dispersed in said magnesium oxide cement, wherein the magnesium oxide cement comprises at least 10 wt % magnesium oxide; and wherein the core layer has a density in the range of 1200 kg/m3 to 1600 kg/m3.

The invention also relates to a method for producing a panel, in particular a floor, wall or ceiling panel, preferably a panel according to the present invention, the method comprising the steps of:
  a) forming a magnesium oxide cement damp composition comprising at least magnesium oxide, natural fibres and water,
  b) subjecting the magnesium oxide cement damp composition to at least one sieving step;
  c) applying at least one layer of the magnesium oxide cement damp composition in or upon a mould part; and
  d) subjecting the layer of magnesium oxide cement damp composition to a force having a pressure of at least 7 MPa, in particular such that a core layer is formed, the core layer comprising an upper core layer and a lower core layer.

The steps of said method are generally subsequent steps. After the pressure of step d) is released, a core layer, or core board whereof multiple core layers can be formed, is obtained. The method according to the present invention allows to produce a core layer having a density in the range of 1200 kg/m3 to 1600 kg/m3, in particular between 1350 kg/m3 and 1550 kg/m3. As indicated above, a core layer comprising magnesium oxide cement and natural fibres, having a density in the range of 1350 kg/m3 to 1550 kg/m3a panel, results in a core layer having a relatively good flexural and structural strength. The method also enables that a core layer can be obtained having a density which is substantially constant over the entire volume of the core layer. This can at least partially be explained by the pressure applied at step d). A substantially constant density is also beneficial for the overall strength of the panel. Typically, the magnesium oxide cement damp composition is formed by mixing at least magnesium oxide powder, natural fibres and water. The magnesium oxide cement damp composition is in practice a substantially powdery composition, which has a lower water content than a convention magnesium oxide cement slurry. The magnesium oxide cement damp composition is typically slightly wet but not soaked. Hence, the magnesium oxide cement damp composition can also be classified as textured composition. Preferably, the magnesium oxide cement damp composition is mixed prior to at least one sieving step. Mixing of the magnesium oxide cement damp composition may contribute to at least part of the natural fibres being encapsulated by magnesium oxide cement. The method according to the present invention allows to achieve panels having a rather consistent quality, which can be at least partially explained by the clever combination of steps b) and d). These steps also at least partially prevent bubble formation and/or remove gas and/or bubbles present in the damp composition. Step d) enables the (chemical) reaction of the components of the magnesium oxide cement damp composition to finish and/or to cure the magnesium oxide cement damp composition. A further benefit of the method according to the present invention, is that where conventional magnesium oxide cement based panels are typically produced by a process using excessive water, the panel according to the present invention can produced via a more process water efficient method. In practice, this means that substantially less process water is used, and needed, during the production process and it also enables a significant reduction of the overall production time. Hence, no overload of water is applied during the production process, which is amongst others, beneficial from environmental point of view. Typically, a predetermined amount of water is applied for forming the magnesium oxide cement damp composition, wherein the amount is determined based upon the water required for the (chemical) reaction with magnesium oxide and optionally any further components and/or curing thereof. For example, the amount of water to be used can be controlled based upon the desired properties of the final product and the desired crystal structure in the core. More specifically, the amount of water in weight percentage or molar ratio added to the composition directly influences which crystal structure is formed in the core during the pressing phase.

Step d) of the method can for example be achieved via at least one pressing and/or compressing step. Step d) enables the removal of excessive liquid from the magnesium oxide cement damp composition. During step d), the magnesium oxide cement damp composition is typically dried and/or cured. It is experimentally found that magnesium oxide and natural fibres effectively bond under pressure. The at least one sieving step enables that a more even composition of magnesium oxide cement damp composition and natural fibres can be obtained. During at least one sieving step a mesh size between 10 and 35 mm could for example be applied. The sieving step can for example be achieved by making use of a processor which preferably comprises brushes and/or sieves, for example sieves having a mesh size between 10 and 35 mm. It is also possible that multiple subsequent sieving steps are applied.

Where it is referred to a mould part also a mould, conveyer, container and/or a plate can be meant. Basically, due to the magnesium oxide cement damp composition having a relatively functional structure, it is not required that the mould part comprises raised edges and/or a rim. Typically, the magnesium oxide cement damp composition has a relatively low moisture content, wherefore the damp composition does not behave like a liquid. This enables easier handling of the composition during processing thereof. Step c) may for example involve applying a layer which is at least partially 4 to 7 cm in thickness of the magnesium oxide cement damp composition in or upon the mould part. As indicated above, the method can also allow the production or core board whereof multiple core layers can be formed.

Preferably, the magnesium oxide cement damp composition formed at step a) has a moisture content below 50%, preferably below 35%, more preferably below 25%. It is for example possible that the magnesium oxide cement damp composition formed at step a) has a moisture content between 25 and 35%. It is possible to apply such relatively low moisture content due to the combination and/or fractions of materials used and the process steps applied in the present method. As indicated above, in the prior art it is known to produce magnesium oxide cement based panels via an extensive and time consuming process of drying of a magnesium oxide cement slurry, wherein the slurry contains at least 50 wt % of water, and often even over 60 wt % water. The need to use an overload of water is overcome by the method according to the present invention. The magnesium oxide cement damp composition may further comprise magnesium hydroxide, magnesium chloride and/or magnesium sulphate. The magnesium oxide cement damp composition may further comprises any of the additives and/or fillers as described for the present invention.

The natural fibres may be any of the above described natural fibres and may be present in any of the above described volumes. The average length of the natural fibres may for example be at least 2 mm. The natural fibres may comprise lignocellulosic fibres, such as but not limited to wood fibres. The method is typically performed under ambient conditions. However, it is also conceivable that the method is performed under vacuum or under a predetermined pressure above atmospheric pressure. Step d) is typically performed for a duration of at least 2 hours, preferably at least 4 hours. Step d) is in a further preferred embodiment performed for a duration between 6 hours and 12 hours. The panels can be demoulded after step d). The boards or panels typically have an initial strength that is at least 50% of the final strength after said duration intervals, and are the sufficiently strong to be further processed. Hence, the required process time is significantly shorter than the process times which are typically required for the production of a magnesium oxide based panel. Conventional processes for the production of a magnesium oxide based panel typically have a duration of at least seven days, which can be even longer in case a layer of fiberglass is included in the panel.

The method may also comprise the step of profiling and/or edging of at least one side edge of at least one panel, and in particular the core layer of the panel. Such step may for example involve that at least one pair of complementary coupling parts is provided at at least two opposite side edges of the panel, preferably wherein the complementary coupling parts are configured such that in a coupled state a pretension is existing. The method may for comprise a step of attaching at least one decorative top layer to the upper core surface of the core layer and/or attaching at least one backing layer to the lower core surface of the core layer. Non-limiting examples of possible backing layers and/or decorative top layers to be used are described above for the panel according to the present invention.

In a further possible embodiment, the layer of magnesium oxide cement damp composition is during step d) subjected to a force having a pressure between 7 MPa and 20 MPa. It is for example also possible that the magnesium oxide cement damp composition is subjected to a force having a pressure below 18 MPa. The preferred pressure applied is at least partially dependent of the desired thickness and/or density of the final product.

It will be apparent that the invention is not limited to the examples described, but that numerous variants are possible within the scope of the attached claims that will be obvious to a person skilled in the art. It is not necessary to elaborate on examples of all conceivable combinations of the above-described inventive concepts, as a person skilled in the art will understand numerous inventive concepts can be (re) combined in order to arrive at a specific application.

The verb "comprise" and conjugations thereof used in this patent publication are understood to mean not only "comprise", but are also understood to mean the phrases "contain", "substantially consist of", "formed by" and conjugations thereof

What is claimed is:

1. A floor, wall, or ceiling panel, comprising:
   at least one core layer, the core layer comprising an upper core surface and a lower core surface and at least one pair of opposite side edges;
   wherein the at least one core layer has a density in the range of 1350 kg/m$^3$ to 1550 kg/m$^3$ and comprises a magnesium oxide cement having a crystal structure expressed as a ternary system of magnesium oxide, a magnesium salt, and water, wherein the magnesium oxide cement comprises at least 30 wt % magnesium oxide;
   wherein the at least one core layer does not contain a reinforcing layer or fiberglass; and
   wherein the at least one core layer comprises at least 20 wt % natural fibres having an average length between 2 and 10 mm dispersed in the magnesium oxide cement forming a reinforcing network.

2. The panel according to claim 1, wherein the magnesium oxide cement comprises between 35 and 55 wt % magnesium oxide.

3. The panel according to claim 1, wherein the average length of the natural fibres is between 2 and 5 mm.

4. The panel according to claim 1, wherein the natural fibres comprise lignocellulosic fibres.

5. The panel according to claim 1, wherein the magnesium salt comprises magnesium chloride and/or magnesium sulphate.

6. The panel according to claim 5, wherein the magnesium oxide cement comprises up to 30 wt % of the magnesium chloride and/or the magnesium sulphate.

7. The panel according to claim 5, wherein the magnesium crystal structure comprises two stable crystalline phases of a 3-phase form and a 5-phase form.

8. The panel according to claim 1, wherein the core layer comprises up to 60 wt % natural fibres.

9. The panel according to claim 1, wherein the magnesium oxide cement comprises magnesium hydroxide.

10. The panel according to claim 1, wherein the density of the core layer is substantially constant over the entire volume of the core layer, wherein the spatial variation of density is below 10% over the entire volume.

11. The panel according to claim 1, wherein the core layer has a density in the range of 1400 to 1500 kg/m3.

12. The panel according to claim 1, wherein at least one pair of opposite side edges of the core layer is provided with complementary coupling parts.

13. The panel according to claim 12, wherein the complementary coupling parts are configured such that in a coupled state a pretension is existing.

14. The panel according to claim 1, comprising at least one decorative top layer attached to the upper core surface of the core layer.

15. The panel according to claim 1, comprising at least one backing layer attached to the lower core surface of the core layer.

16. A method for producing a floor, wall or ceiling panel according to claim 1, comprising the steps of:
   a) forming a magnesium oxide cement damp composition comprising at least magnesium oxide, natural fibres and water,
   b) subjecting the magnesium oxide cement damp composition to at least one sieving step;
   c) applying at least one layer of the magnesium oxide cement damp composition upon a mould part; and
   d) subjecting the layer of magnesium oxide cement damp composition to a force having a pressure of at least 7 MPa.

17. The method according to claim 16, wherein the magnesium oxide cement damp composition has a moisture content below 50%, or optionally, below 35%, or optionally, below 25%.

18. The method according to claim 16, wherein the magnesium oxide cement damp composition comprises magnesium hydroxide, magnesium chloride and/or magnesium sulphate.

19. The method according to claim 16, wherein step d) is performed for a duration between 6 hours and 12 hours.

20. The method according to claim 16, wherein during step d) the layer of magnesium oxide cement damp composition is subjected to a force having a pressure between 7 MPa and 20 MPa.

* * * * *